United States Patent [19]

Yoneda

[11] Patent Number: 5,307,178
[45] Date of Patent: Apr. 26, 1994

[54] FACSIMILE TERMINAL EQUIPMENT

[75] Inventor: Noboru Yoneda, Yokohama, Japan

[73] Assignee: Fujitsu Limited, Kawasaki, Japan

[21] Appl. No.: 626,765

[22] Filed: Dec. 13, 1990

[30] Foreign Application Priority Data

Dec. 18, 1989 [JP]  Japan .................................. 1-326069

[51] Int. Cl.⁵ .................................................. H04N 1/00
[52] U.S. Cl. ..................................... 358/440; 358/444;
358/434; 358/400
[58] Field of Search ............... 358/439, 440, 441, 437,
358/402, 403, 404, 444; 379/100, 95;
340/825.34, 825.31, 825.32

[56] References Cited

U.S. PATENT DOCUMENTS

| 4,447,676 | 5/1984 | Harris | 379/199 |
| 4,668,994 | 5/1987 | Takahashi et al. | 358/256 |
| 4,870,503 | 9/1989 | Miura | 358/440 |
| 4,905,281 | 2/1990 | Surjaatmadja | 340/825.34 |
| 4,922,521 | 5/1990 | Krikke et al. | 379/95 |
| 5,131,025 | 7/1992 | Hamasaki | 379/95 |

FOREIGN PATENT DOCUMENTS

| 0041695A1 | 12/1981 | European Pat. Off. | |
| 0128867 | 7/1984 | Japan | 358/440 |
| 63-067857 | 3/1988 | Japan | |
| 01243744 | 9/1989 | Japan | |

Primary Examiner—Edward L. Coles, Sr.
Assistant Examiner—Fan Lee
Attorney, Agent, or Firm—Staas & Halsey

[57] ABSTRACT

In facsimile terminal equipment, ID numbers to be rejected are stored in advance and, when a received ID number is included in the stored ID numbers, a command to disconnect facsimile communication is transmitted to a transmitting facsimile terminal. Unnecessary communication can thereby be rejected without removing the advantage of facsimile communication that an image can be received from any unspecified subscriber.

3 Claims, 5 Drawing Sheets

FACSIMILE TERMINAL EQUIPMENT

BACKGROUND OF THE INVENTION

1. Field of the Invention

The present invention relates to facsimile terminal equipment and, more particularly, to facsimile terminal equipment which rejects unnecessary communication.

2. Description of the Related Art

Facsimile terminal equipment can receive image information from unspecified subscribers over public telephone lines. Some conventional facsimile terminal equipment can reject unnecessary communication to cope with prank transmission, one-sided transmission such as direct mail or wrong transmission from unspecified subscribers. In this case, subscribers who constitute a closed-area group are allocated ID numbers and, when image information is received, the ID number is checked to determine whether or not the information is from one of the subscribers in the group. If the ID number is valid, the image information is accepted. If not, the communication is rejected.

However, with the above system, one of advantages of facsimile communication, that an image can be received from any unspecified subscriber, is removed.

SUMMARY OF THE INVENTION

It is therefore an object of the present invention to provide facsimile terminal equipment which can reject unnecessary communication, but does not remove the ability to receive facsimile communication from any subscriber.

A feature of the present invention resides in facsimile terminal equipment comprising, facsimile communication control means for controlling facsimile communication, ID number detecting means for detecting the ID number of a transmitting facsimile terminal from a received signal; ID number memory means for storing the detected ID number; rejection number input means for inputting an ID number to be rejected; rejection number memory means for storing the ID number to be rejected input from the rejection number input means; and comparator means for permitting the facsimile communication control means to transmit a disconnect command to the transmitting facsimile terminal when the data stored in the ID number memory means is included in data stored in the rejection number memory means.

DETAILED DESCRIPTION OF THE PREFERRED EMBODIMENT

Figure 1:
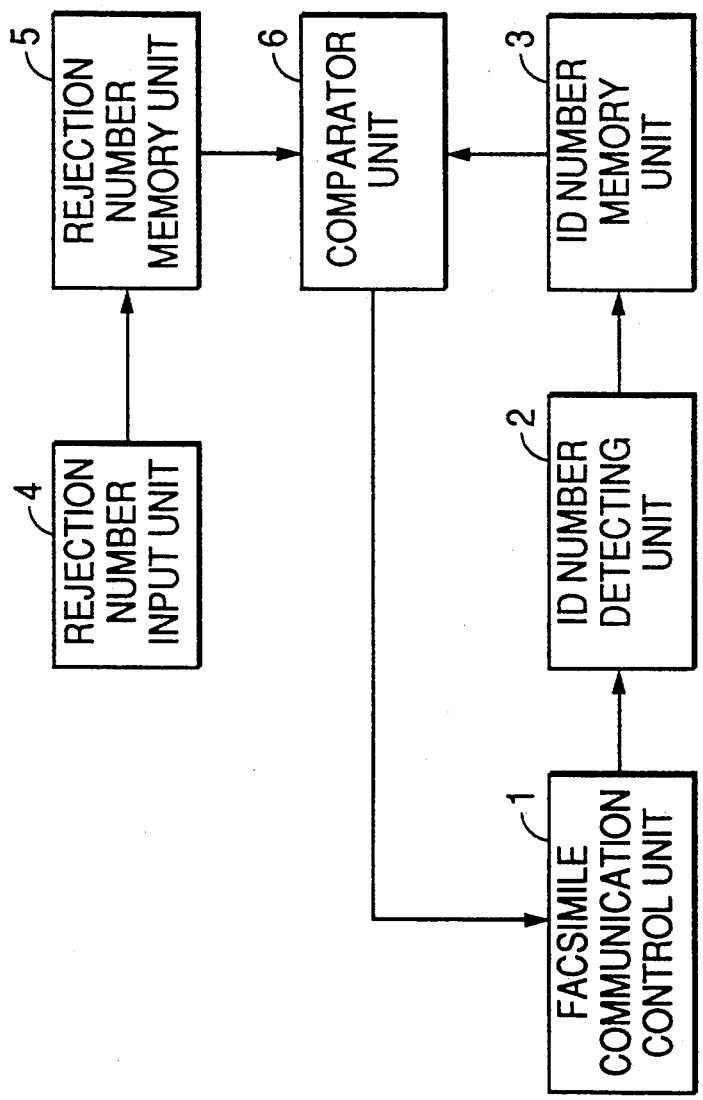
FIG. 1 and FIG. 2 illustrate, in block form, the principle of the present invention.

Facsimile terminal equipment according to a first embodiment of the present invention comprises, as shown in FIG. 1, a facsimile communication control unit 1 for performing a communication control of facsimile terminal equipment; the ID number detecting unit 2 for detecting the ID number of transmitting facsimile equipment from a received signal; an ID number memory unit 3 for storing the detected ID number; a rejection number input unit 4 for inputting an ID number to be rejected; a rejection number memory unit 5 for storing the input ID number to be rejected; and a comparator unit 6 which permits the facsimile communication control unit 1 to transmit a disconnect command to the transmitting equipment when data stored in the ID number memory unit 3 is included in data stored in the rejection number memory unit 5.

Figure 2:
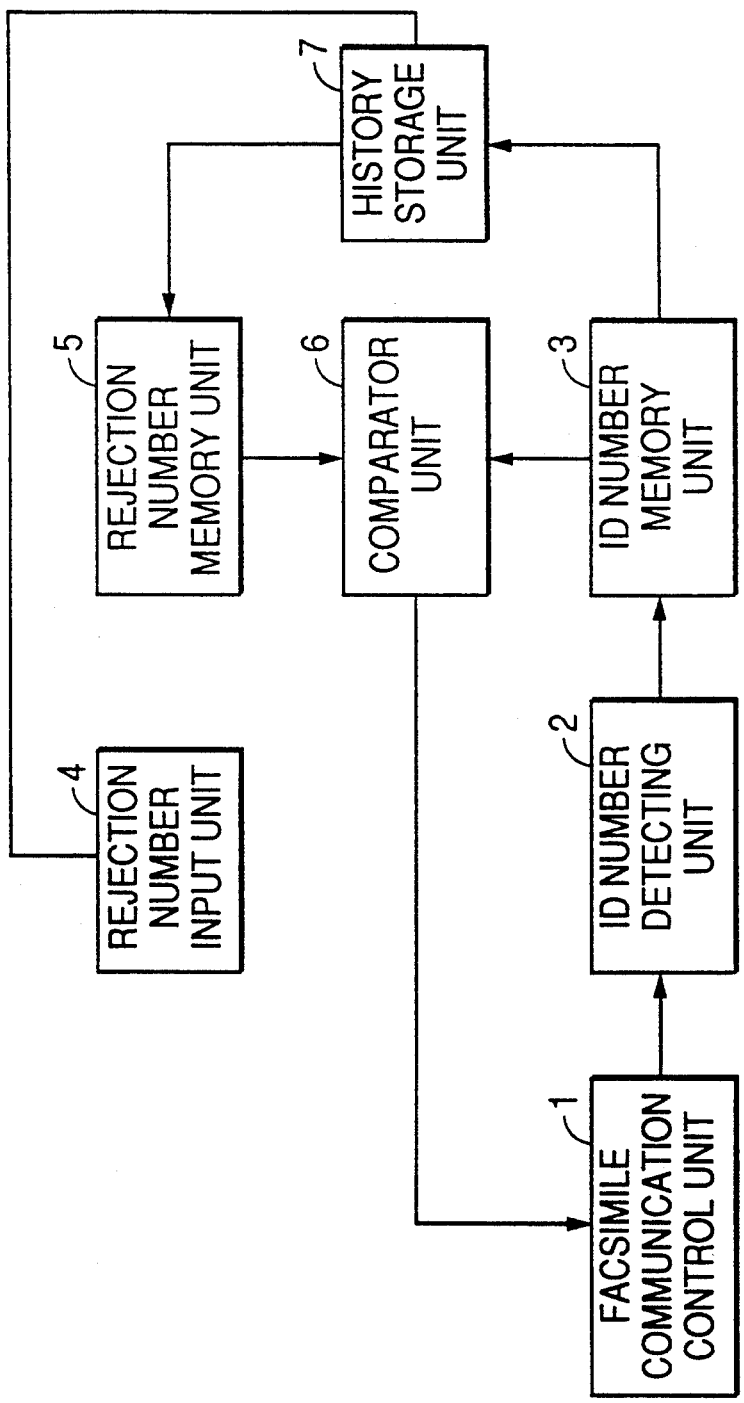

Facsimile terminal equipment according to a second embodiment of the present invention comprises, as shown in FIG. 2, a facsimile communication control unit 1 for performing communication control of facsimile terminal equipment; an ID number detecting unit 2 for detecting an ID number of transmitting facsimile equipment from a received signal; an ID number memory unit 3 for storing the detected ID number; a history storage unit 7 for storing previously received ID numbers; a rejection number input unit 4 for selecting an ID number or numbers to be rejected from among ID numbers stored in the history storage unit; a rejection number memory unit 5 for storing selected ID numbers to be rejected; and a comparator unit 6 which permits the facsimile communication control unit to transmit a disconnect command to the transmitting facsimile equipment when the data stored in the ID number memory unit 3 is included in the data stored in the rejection number memory unit 5.

The facsimile terminal equipment of the first embodiment may further be provided with a display unit for displaying the ID number input from the rejection number input unit. The facsimile terminal equipment of the second embodiment may also be provided with a display unit for displaying the ID numbers stored in the history storage unit.

The rejection number input unit of the equipment of the second embodiment may have not only a function of selecting an ID number to be rejected from among ID numbers stored in the history storage unit but also a function of inputting an arbitrary ID number to be rejected as in the rejection number input unit of the first embodiment.

According to the first embodiment, the facsimile communication control unit 1 performs communication control of facsimile equipment and detects the ID number of transmitting facsimile terminal equipment from a signal received by the ID number detecting unit 2. The ID number memory unit 3 stores the detected ID number. An ID number input from the rejection number input unit 4 as an ID number to be rejected is stored in the rejection number memory unit 5. The comparator unit 6 compares the data stored in the ID number memory unit 3 with data stored in the rejection number memory unit 5 and permits the facsimile communication control unit 1 to transmit a disconnect command to the transmitting facsimile equipment when the data stored in the ID number memory unit 3 is included in the data stored in the rejection number memory unit 5. The facsimile communication from the transmitting facsimile equipment having a specific ID number is thereby disconnected.

According to the second embodiment of the present invention, an ID number to be rejected, which is selected from the past communication history stored in the history storage unit 7, can be input easily and accurately.

Hereinafter the preferred embodiment of the present invention will be described with reference to the drawings.

Figure 3:
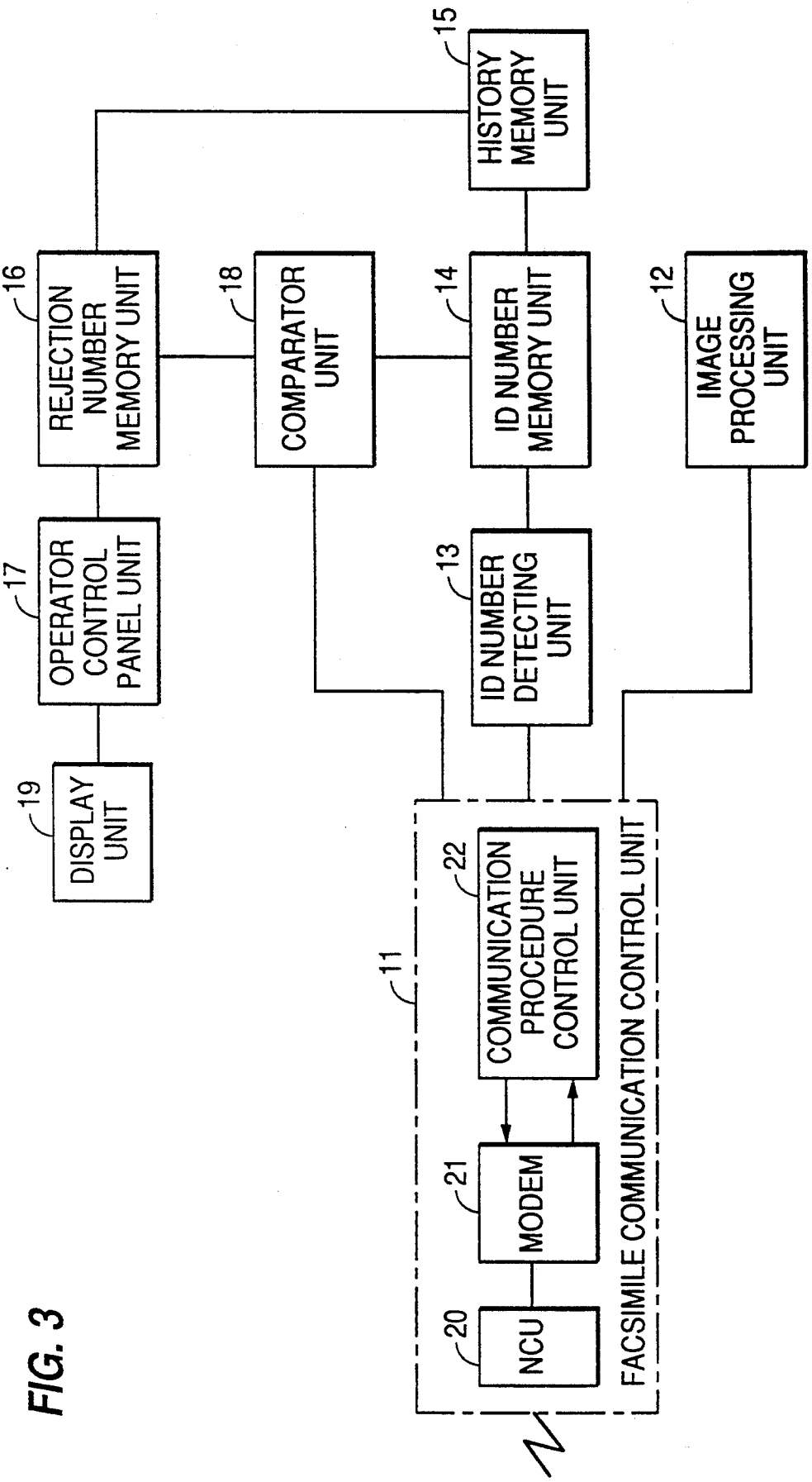
FIG. 3 is block diagram of a specific embodiment of the facsimile terminal equipment of the present invention.
Figure 4:
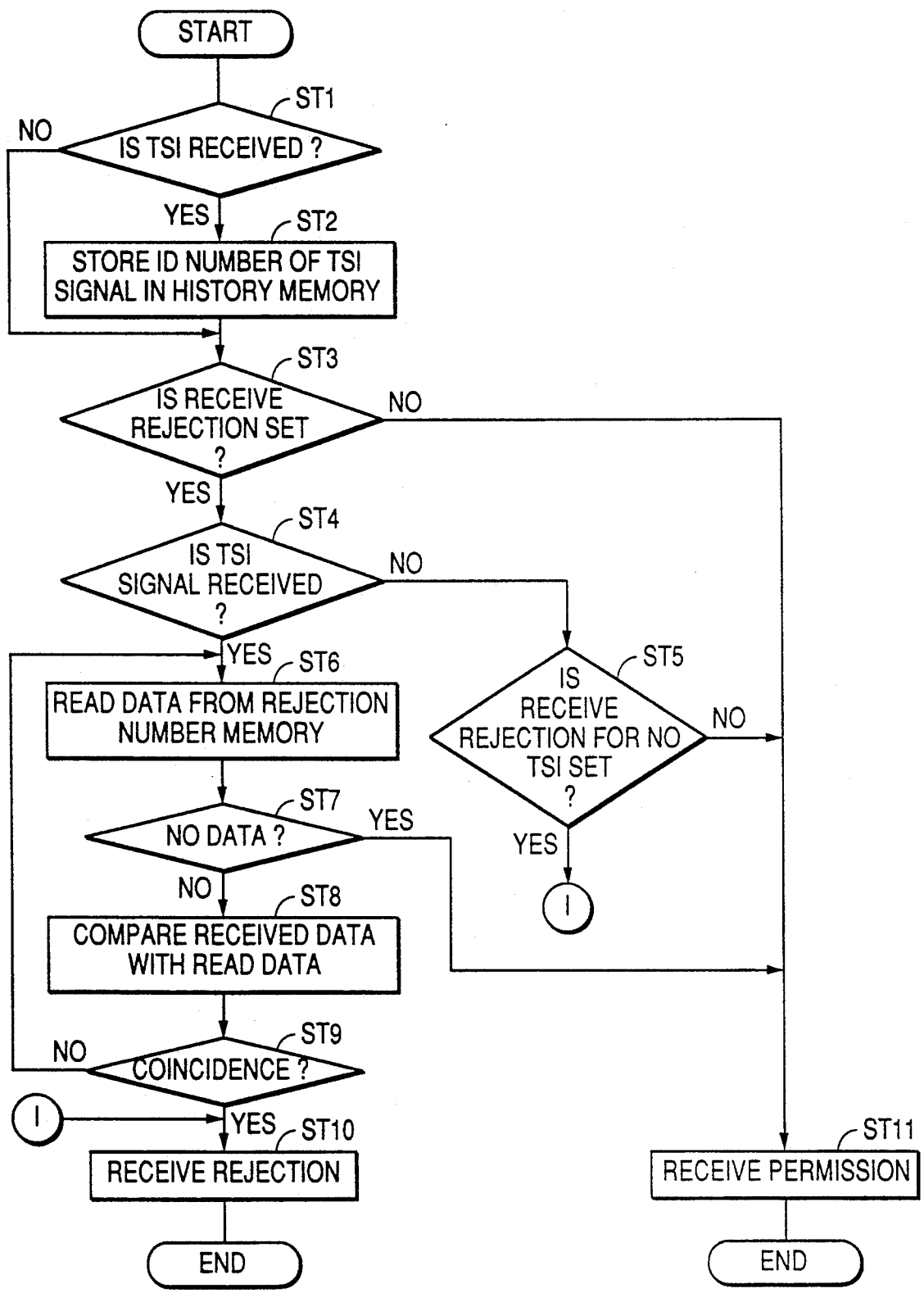
FIG. 4 is a flowchart illustrating the operation of the facsimile terminal equipment shown in FIG. 3.
Figure 5:
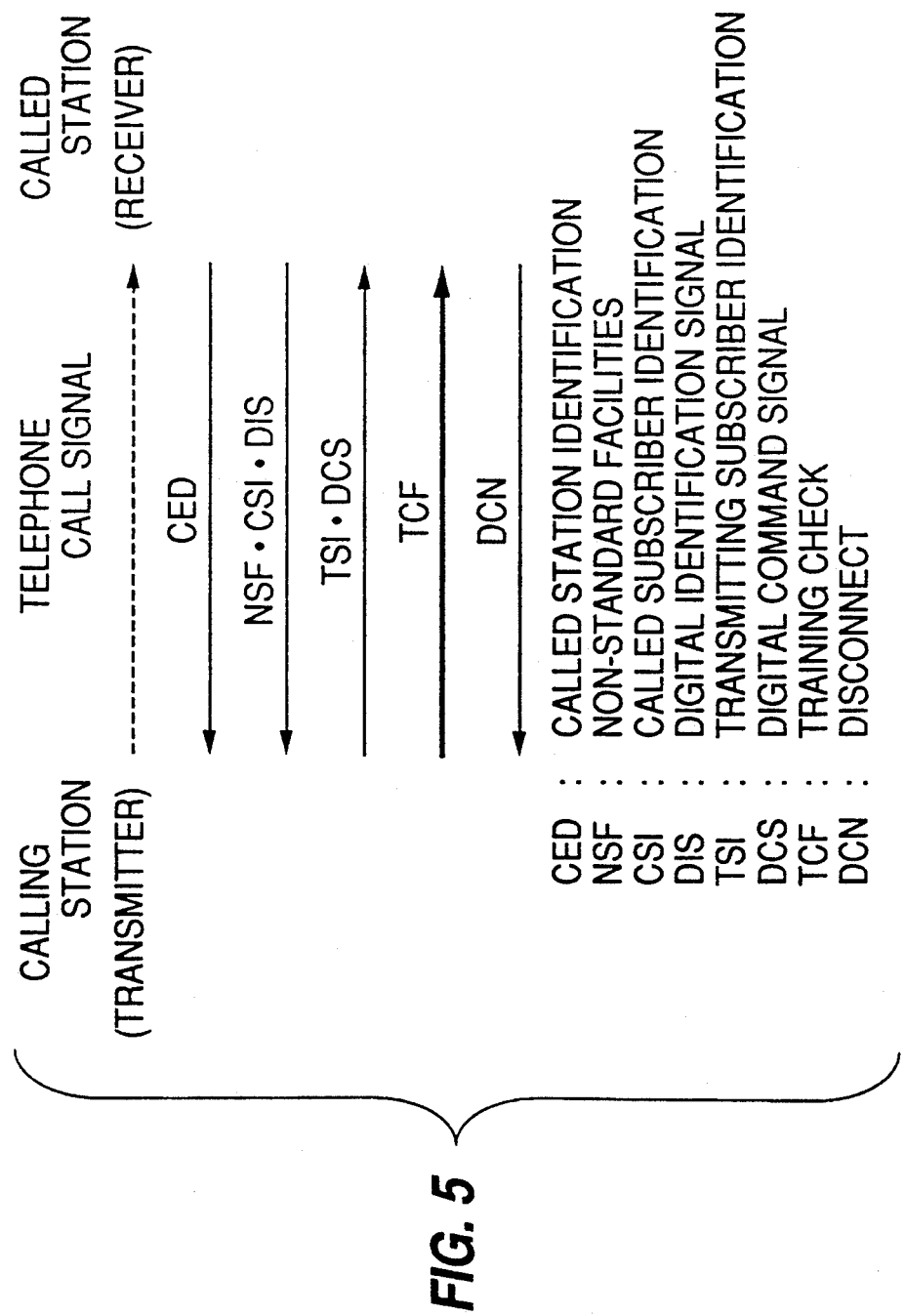
FIG. 5 illustrates transmission and reception of control signals by the facsimile terminal equipment shown in FIG. 3.

FIGS. 3 through 5 illustrate facsimile terminal equipment embodying the present invention. In FIG. 3, 11 designates a facsimile communication control unit for performing a communication control of the facsimile terminal equipment, 12 designates an image processing unit for decoding received image data and finally outputting the image in hard copy form, 13 designates an ID number detecting unit for detecting the ID number of a transmitting station from control signals transmitted and received at an initial stage of facsimile communication, 14 designates an ID number memory unit for storing the ID number detected by the ID number detecting unit 13, 15 designates a history memory unit which serves as a history storage unit for storing a predetermined number of previously received ID numbers, 16 designates a rejection number memory unit for storing ID numbers of subscribers to be rejected, 17 designates an operator control panel unit which serves as a rejection number input unit for inputting a new ID number to be rejected into the rejection number memory unit 16 and selecting an ID number to be rejected from among previously rejected ID numbers stored in the history memory unit 15 for entry into the rejection number memory unit 16, 18 designates a comparator unit for permitting the facsimile control unit to transmit a disconnect command to the originating station when the ID number detected by the ID number detecting unit and then stored in the ID number memory unit 14 includes ID numbers stored in the rejection number memory unit 16, and 19 designates a display unit for displaying the input ID number when the new rejection number is input through the operator control panel unit 17 or the previously received ID numbers stored in the history memory unit 15 when an ID number to be rejected is selected from among the previously received ID numbers.

In the present embodiment, the comparator unit 18 is designed to also produce a disconnect command when no ID number is transmitted from a transmitting station.

Here, as illustrated in FIG. 3, the facsimile communication control unit 11 is comprised of a network control unit (NCU) 20, a modem 21 and a communication procedure control unit 22.

Next, the operation of the present embodiment will be described.

First, an ID number to be rejected is entered into the rejection number memory unit 16. In this case, an operator may enter the ID number directly using the keyboard of the operator control panel unit 17 while watching the display unit 19, or may select the ID number from the past history stored in the history memory unit 15, which is visually displayed on the display unit, through the operator control panel unit 17 for entry into the memory unit 16.

In such a state, when facsimile communication is received, transmission and reception of control signals are made in accordance with the procedure shown in FIG. 5. This procedure conforms to that of the G3-standard facsimile system, and will be described in detail.

First, a called receiving terminal sends a CED signal (2100Hz ±15Hz, for 2.6 ; seconds to 4.0 seconds) indicating that the terminal is a non-voice terminal and subsequently sends binary code procedure signals (NSF, CSI, DIS signals) in a synchronous mode of 300bps. Here the NSF signal is an option signal indicating non-standard receiver facilities which are out of the sphere of Recommendation T-series of the CCITT. The CSI signal is an option signal for informing the ID number of the receiving terminal through an international telephone number, and the DIS signal is a signal indicating the standard receiver facilities prescribed by Recommendation T-series of the CCITT.

A G3-standard facsimile transmitter which has received the DIS signal transmits TSI, DCS signals in the 300-bps binary code procedure and subsequently transmits a TCF signal at a data rate specified by the DCS signal. Here the TSI signal is an option signal adapted to inform the ID number of the transmitting terminal through an international telephone number, and the DCS signal is a receive command signal responding the standard facilities informed by the DIS signal. The TCF signal is transmitted through a Recommendation T.4 modulation system. More specifically, the TCF signal is formed of a sequence 0s and has a duration of 1.5 seconds ±10 percent. The signal is adapted to check training and determine whether or not communication is possible at the specified data rate.

On the other hand, the receiving terminal in which receive rejection is set compares the received TSI signal with the ID numbers stored in the rejection number memory unit 16 and, when a coincidence occurs, transmits a DCN signal in the form of a binary signal of 300bps, thereby disconnecting communication. Here the DCN signal is a command signal indicating initiation of the phase E (calling disconnection).

Next, the procedure of the facsimile terminal equipment of the present invention will be described with reference to the flowchart of FIG. 4.

First, a decision is made as to whether or not the TSI signal containing an ID number has been received (ST1). If it has, the ID number is stored in the history memory unit 15 (ST2).

Subsequently, a decision is made as to whether or not the setting of receive rejection has been made in advance for a specific ID number or numbers (ST3). If it has not, a command to permit the reception of communication is issued (ST11), whereby the procedure is terminated. If it has, a decision is made as to whether or not the TSI signal has been received (ST4).

Since a calling station is free to transmit the TSI signal or not, it is predetermined by initialization whether or not reception is to be rejected when no TSI signal is received. When the TSI signal has not been received in ST4, a decision is made as to whether or not the setting of receive rejection when no TSI signal is received has been made in advance (ST5). If it has not, a signal to permit the reception is produced (ST11). If it has, a signal to reject the reception is produced at this stage (ST10). In either case, the procedure is terminated. The signal to reject reception is the DCN signal illustrated in FIG. 5.

If, on the other hand, the TSI signal has been received, an ID number is detected from the TSI signal and then stored in the ID number memory unit 14. Subsequently, one piece of data (an ID number to be rejected) is read from the rejection number memory unit 16 (ST6). At this time a decision is made as to whether or not new data to be read is left in the rejection number memory unit 16 (ST7). If it is, it (an ID number to be rejected) is compared with data (the received ID number) stored in the ID number memory unit 14 (ST8) to decide whether or not a coincidence occurs therebetween (ST9).

If no coincidence occurs, new data is read from the rejection number memory unit 16 in ST6 and the comparison and decision steps are performed for the new data in ST8 and ST9. Such processes are performed repeatedly until a coincidence occurs. When it does, a receive rejection signal is produced (ST10), thereby terminating the procedure. However, when data which is not yet read is no longer left in the rejection number memory unit 16 before a data coincidence occurs, a command to permit reception is produced (ST11), whereby the procedure is terminated.

According to the present embodiment, therefore, facsimile communication from a transmitting station with a specific ID number can be disconnected. Moreover, an ID number to be rejected can be selected from past communication history stored in the history memory unit 15, thus permitting an ID number to be rejected to be entered easily and accurately.

As described above, according to the first embodiment of the present invention, a comparison is made between data stored in a rejection number memory unit and an ID number memory unit and a disconnect command is sent to a transmitting station when the data stored in the ID number memory unit is included in data stored in the rejection number memory unit. This provides an advantage of disconnecting a facsimile communication from a transmitting station with a specific ID number without removing the advantage of facsimile communication in which images can be received from unspecified subscribers.

According to a second embodiment of the present invention, in addition to the above advantage, an ID number to be rejected can be selected from the communication history stored in the history storage unit, thus providing the advantage that an ID number to be rejected can be entered easily and accurately.

What is claimed is:

1. Facsimile terminal equipment, comprising:
   facsimile communication control means for controlling facsimile communication;
   ID number detecting means for detecting a first ID number of a transmitting facsimile terminal from a received signal;
   ID number memory means for storing first data including the first ID number;
   history storage means for storing previously received ID numbers;
   rejection number input means for selecting and inputting a second ID number to be rejected from the previously received ID numbers stored in said history storage means;
   rejection number memory means for storing second data including the second ID number selected by said rejection number input means; and
   comparator means for permitting said facsimile communication control means to transmit a disconnect command to said transmitting facsimile terminal when the first data stored in said ID number memory means is included in the second data stored in said rejection number memory means.

2. The facsimile terminal equipment according to claim 1, further comprising display means for displaying the second ID number selected by said rejection number input means.

3. The facsimile terminal equipment according to claim 1, further comprising display means for displaying the previously received ID numbers stored in said history storage means.

* * * * *